US010690893B2

(12) United States Patent
Kunugise et al.

(10) Patent No.: US 10,690,893 B2
(45) Date of Patent: Jun. 23, 2020

(54) IMAGING LENS AND IMAGING APPARATUS

(71) Applicant: FUJIFILM Corporation, Tokyo (JP)

(72) Inventors: Takashi Kunugise, Saitama (JP); Kazuyoshi Okada, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 149 days.

(21) Appl. No.: 16/130,123

(22) Filed: Sep. 13, 2018

(65) Prior Publication Data
US 2019/0086650 A1    Mar. 21, 2019

(30) Foreign Application Priority Data

Sep. 19, 2017 (JP) ................................. 2017-178515

(51) Int. Cl.
| | | |
|---|---|---|
| *G02B 13/22* | (2006.01) | |
| *G02B 27/00* | (2006.01) | |
| *G02B 13/04* | (2006.01) | |
| *G02B 15/14* | (2006.01) | |
| *G02B 13/00* | (2006.01) | |

(52) U.S. Cl.
CPC .......... *G02B 13/22* (2013.01); *G02B 13/0045* (2013.01); *G02B 15/14* (2013.01); *G02B 27/0025* (2013.01); *G02B 13/04* (2013.01)

(58) Field of Classification Search
CPC .......... G02B 13/22; G02B 13/04; G02B 9/12; G02B 9/34; G02B 9/60; G02B 9/62; G02B 9/64; G02B 13/0045; G02B 27/0025
See application file for complete search history.

(56) References Cited

U.S. PATENT DOCUMENTS

| | | | |
|---|---|---|---|
| 5,682,269 A | 10/1997 | Kimura et al. | |
| 6,016,229 A | 1/2000 | Suzuki | |
| 9,417,436 B2* | 8/2016 | Shirasuna | .............. G02B 13/04 |
| 2003/0128438 A1 | 7/2003 | Wada | |
| 2010/0208366 A1* | 8/2010 | Inoue | ..................... G02B 13/04 |
| | | | 359/784 |

(Continued)

FOREIGN PATENT DOCUMENTS

| | | |
|---|---|---|
| JP | H08-166537 A | 6/1996 |
| JP | H09-043512 A | 2/1997 |

(Continued)

OTHER PUBLICATIONS

An Office Action; "Notification of Reasons for Refusal," mailed by the Japanese Patent Office dated Mar. 31, 2020, which corresponds to Japanese Patent Application No. 2017-178515 and is related to U.S. Appl. No. 16/130,123 with English language translation.

*Primary Examiner* — Jordan M Schwartz
(74) *Attorney, Agent, or Firm* — Studebaker & Brackett PC

(57) ABSTRACT

The imaging lens consists of, in order from the object side, a first lens group, an aperture stop, a second lens group having a positive refractive power. During focusing from a distant object to a close-range object, the first lens group remains stationary, and the aperture stop and the second lens group integrally move to the object side. The imaging lens satisfies predetermined conditional expressions relating to a focal length of the whole system, a focal length of the first lens group, a principal point position of the second lens group, a focal length of the second lens group, a back focal length, and the like.

19 Claims, 12 Drawing Sheets

EXAMPLE 1

(56) References Cited

U.S. PATENT DOCUMENTS

| | | |
|---|---|---|
| 2011/0043927 A1 | 2/2011 | Sudoh |
| 2015/0268449 A1* | 9/2015 | Kurioka ............. G02B 13/0045 348/360 |
| 2016/0202452 A1 | 7/2016 | Kuo et al. |

FOREIGN PATENT DOCUMENTS

| | | |
|---|---|---|
| JP | H11-52228 A | 2/1999 |
| JP | 2000-258686 A | 9/2000 |
| JP | 2003-202493 A | 7/2003 |
| JP | 2006-113446 A | 4/2006 |
| JP | 2013-232014 A | 11/2013 |

* cited by examiner

FIG. 1
EXAMPLE 1
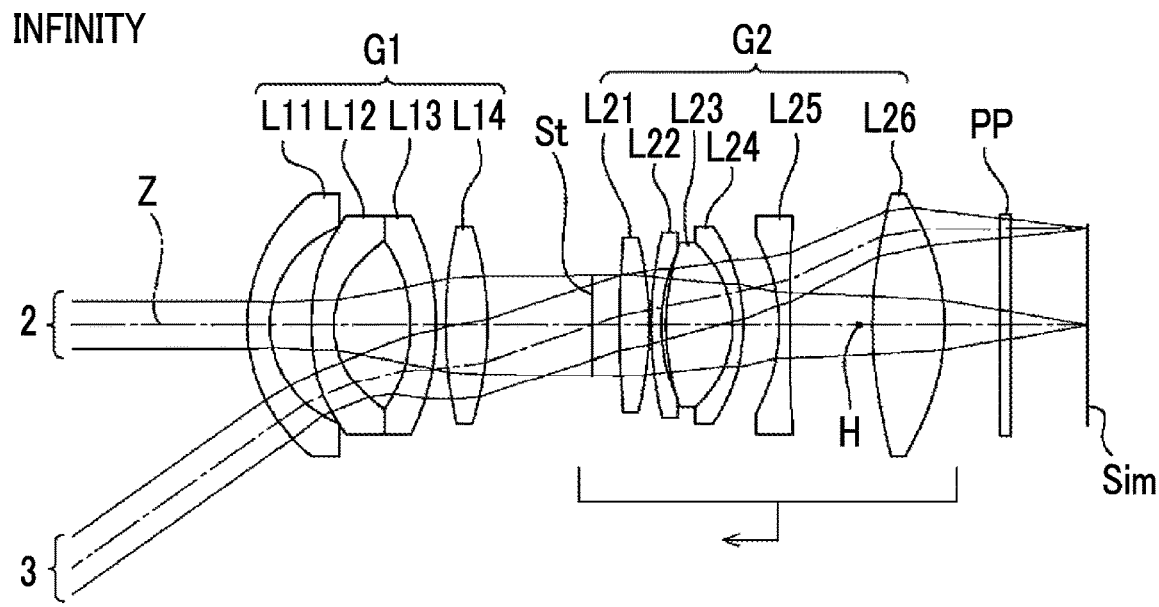
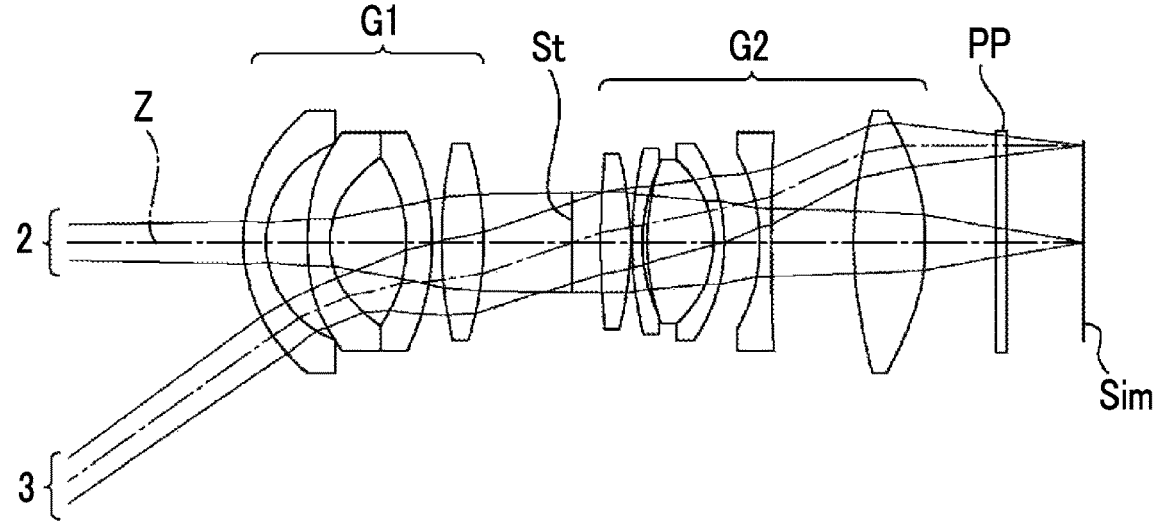

FIG. 3
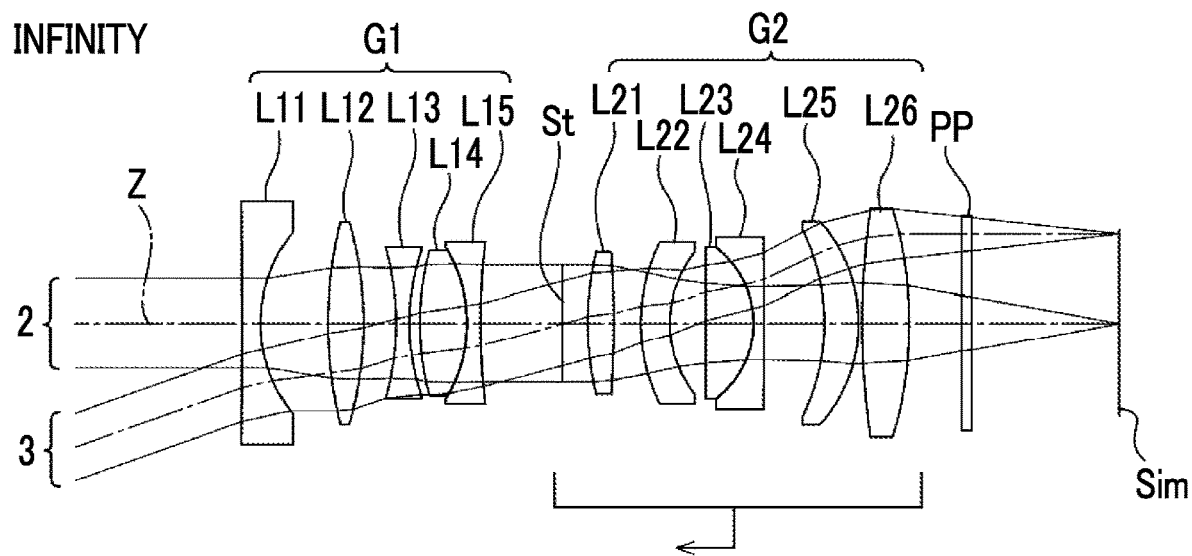
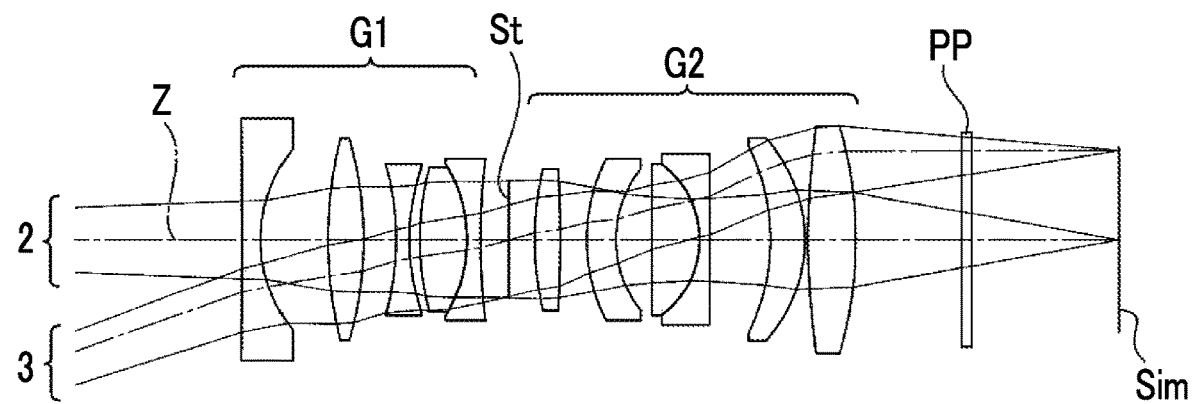

FIG. 4
EXAMPLE 3
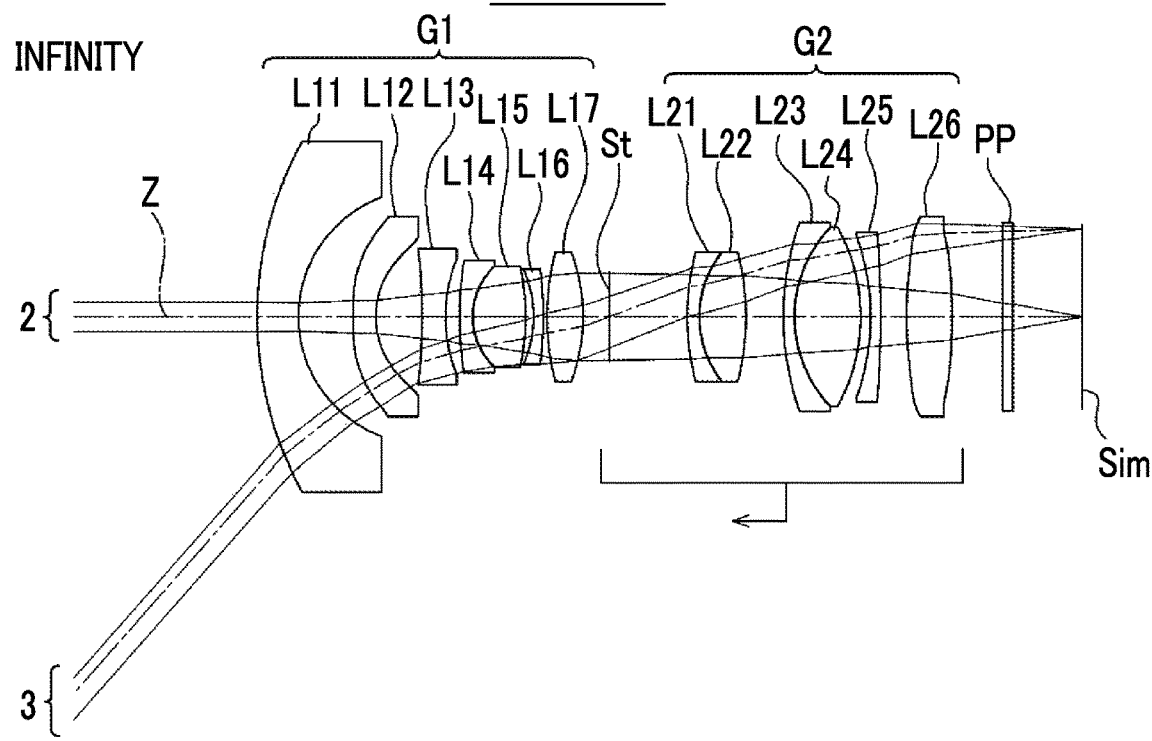
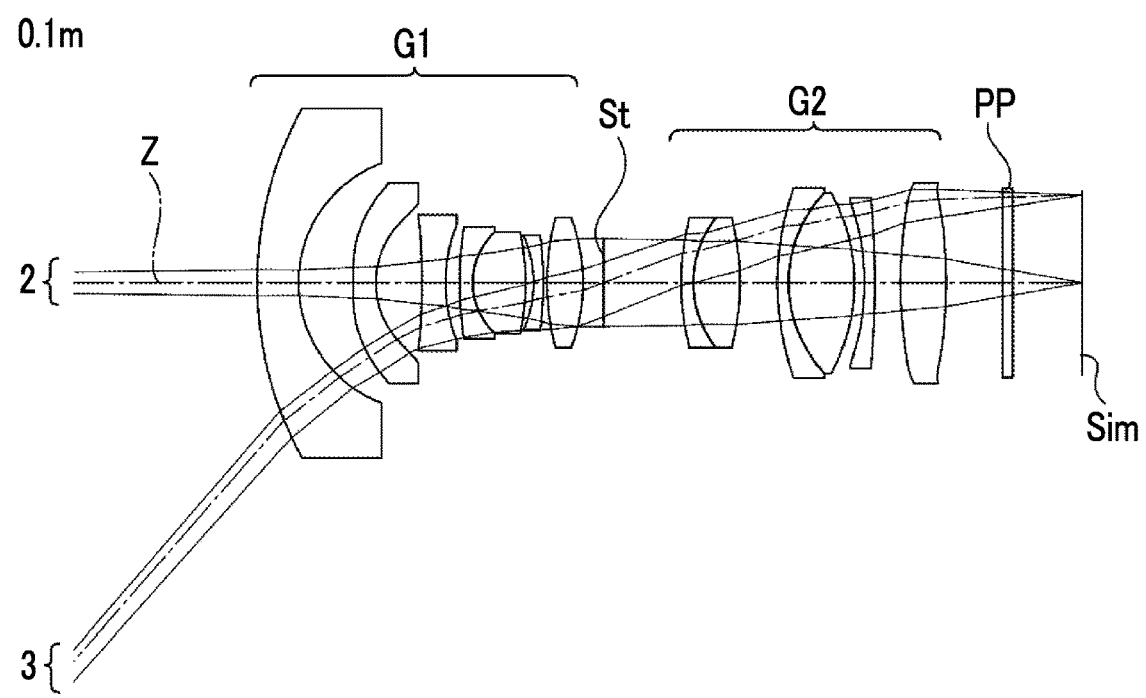

FIG. 5
EXAMPLE 4
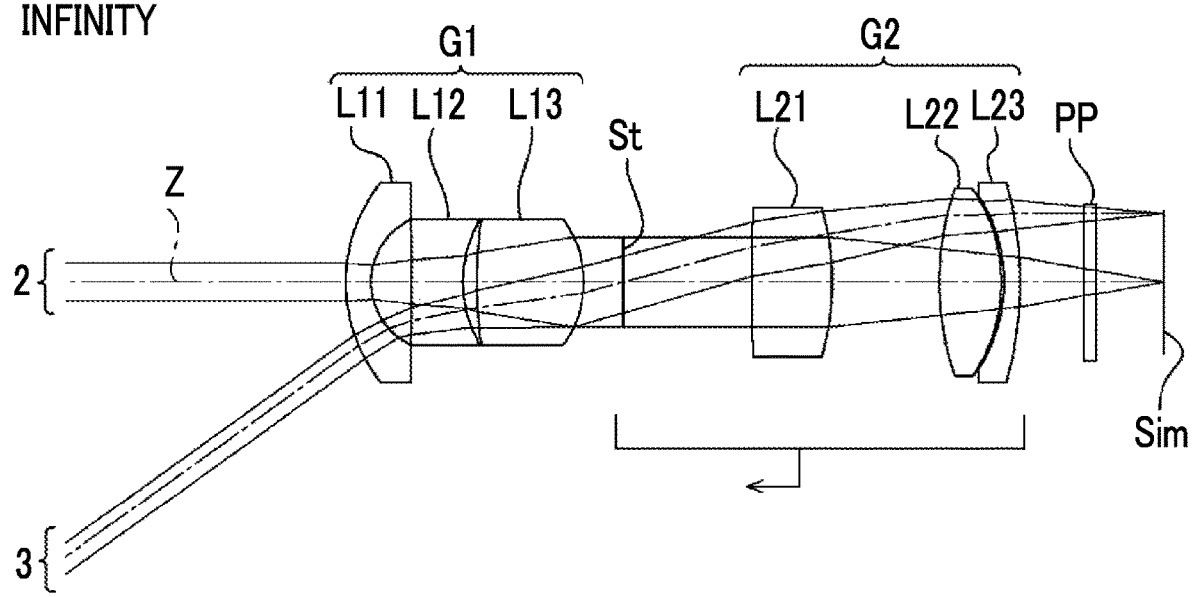
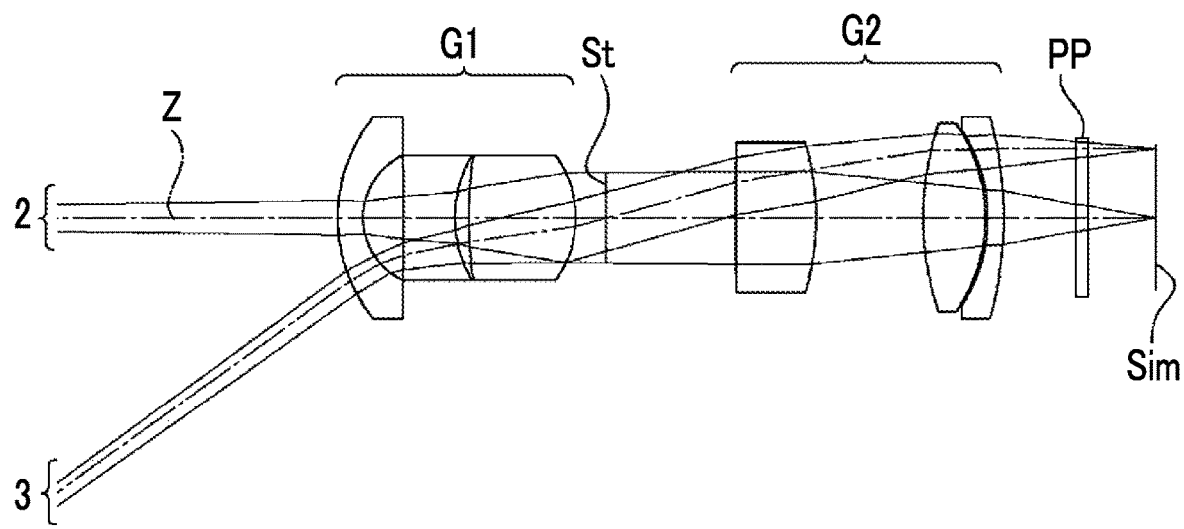

FIG. 6
EXAMPLE 5
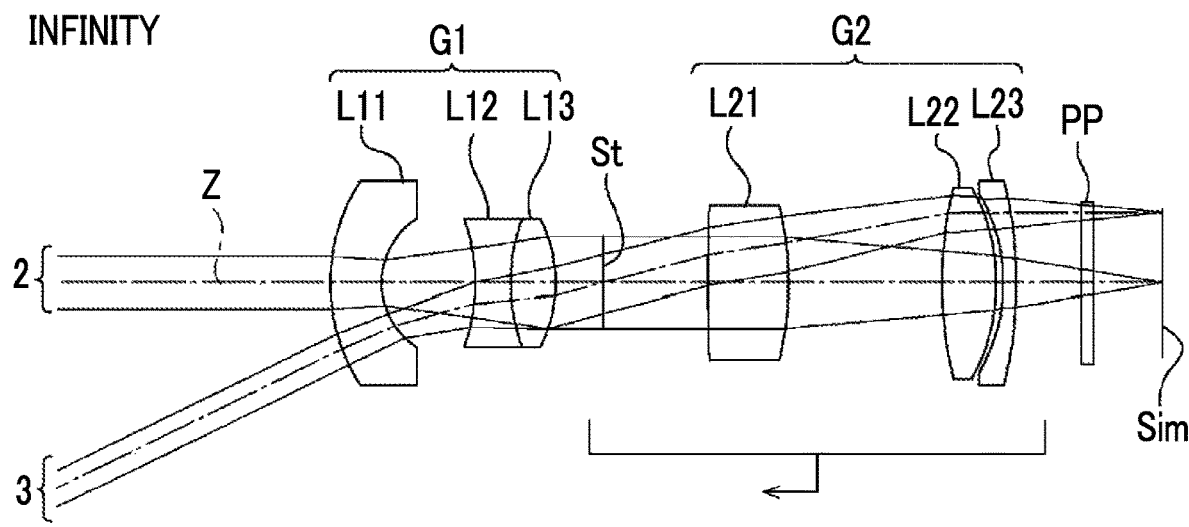
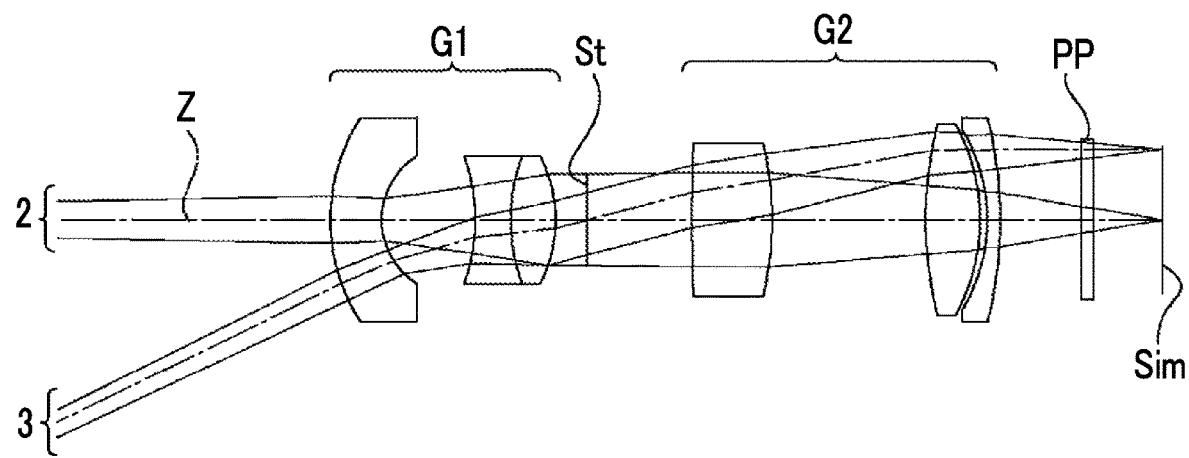

EXAMPLE 1

EXAMPLE 2

EXAMPLE 4

IMAGING LENS AND IMAGING APPARATUS

CROSS-REFERENCE TO RELATED APPLICATIONS

The present application claims priority under 35 U.S.C. § 119 to Japanese Patent Application No. 2017-178515, filed on Sep. 19, 2017. The above application is hereby expressly incorporated by reference, in its entirety, into the present application.

BACKGROUND OF THE INVENTION

1. Field of the Invention

The present invention relates to an imaging lens and an imaging apparatus. In particular, the present invention relates to an imaging lens, which is suitable for a factory automation (FA) camera, a machine vision (MV) camera, a digital camera, a surveillance camera, an on-board camera, a cinema camera, and the like, and an imaging apparatus comprising the imaging lens.

2. Description of the Related Art

In MV cameras and the like, an imaging lens having a focusing function has been used. As an imaging lens that has a focusing function conventionally known, for example, there are lenses described in JP2003-202493A, JP1997-43512A (JP-H09-43512A), and JP1996-166537A (JP-H08-166537A). JP2003-202493A, JP1997-43512A (JP-H09-43512A), and JP1996-166537A (JP-H08-166537A) describe a retrofocus lens system of a rear focus type.

SUMMARY OF THE INVENTION

In recent years, the camera is generally configured by combining an imaging lens and an imaging element such as a charge coupled device (CCD) or a complementary metal oxide semiconductor (CMOS). In such a configuration, there is a demand for an imaging lens having a small angle of incidence of the principal ray onto the image plane at the maximum angle of view regardless of the imaging distance, for the purpose of suppressing a decrease in amount of peripheral light and the like. Further, in the above-mentioned camera, there is also a demand for small fluctuation in angle of view caused by focusing. Furthermore, in consideration of the standard of the mount portion that joins the camera body and the imaging lens, there is a demand for an imaging lens that has a configuration capable of making the product outer diameter small.

However, it is difficult for the lens system described in JP2003-202493A and JP1997-43512A (JP-H09-43512A) to reduce the product outer diameter of the imaging lens. In the lens system described in JP1996-166537A (JP-H08-166537A), it can not be said that the angle of incidence of the principal ray onto the image plane at the maximum angle of view is sufficiently small.

The present invention has been made in consideration of the above-mentioned situations, and its object is to provide an imaging lens, which can be configured to have a small angle of incidence of the principal ray onto the image plane at the maximum angle of view regardless of an imaging distance, small fluctuation in angle of view caused by focusing, and a small product outer diameter and to have favorable performance, and an imaging apparatus comprising the imaging lens.

In order to cope with the above-mentioned demands, an imaging lens of the present invention consists of, in order from an object side to an image side: a first lens group; an aperture stop; and a second lens group that has a positive refractive power. During focusing from a distant object to a close-range object, the first lens group remains stationary with respect to an image plane, and the aperture stop and the second lens group integrally move toward the object side. In a state where an object at infinity is in focus, assuming that a focal length of a whole system is f, a focal length of the first lens group is f1, a distance from the aperture stop to an object side principal point of the second lens group in a direction of an optical axis is sH, a focal length of the second lens group is f2, a height of paraxial on-axis ray on a lens surface closest to the object side in the first lens group is h1, a height of paraxial on-axis ray on a lens surface closest to the image side in the first lens group is h2, and a back focal length of the whole system at an air-converted distance is Bf, all Conditional Expressions (1), (2), (3), and (4) are satisfied.

$-0.1 < f/f1 < 0.1$ (1)

$0.8 < sH/f2 < 1.2$ (2)

$0.3 < h1/h2 < 1$ (3)

$1.4 < f/(Bf \times (h1/h2)) < 2.5$ (4)

It is preferable that the imaging lens of the present invention satisfies at least one of Conditional Expression (1-1), (2-1), (3-1), or (4-1).

$-0.06 < f/f1 < 0.06$ (1-1)

$0.85 < sH/f2 < 1.1$ (2-1)

$0.35 < h1/h2 < 0.8$ (3-1)

$1.55 < f/(Bf \times (h1/h2)) < 2$ (4-1)

In the imaging lens of the present invention, in a state where the object at infinity is in focus, assuming that a distance on the optical axis between the first lens group and the second lens group is d, and an air-converted distance on the optical axis from a lens surface closest to the object side in the second lens group to an object side focal point of the second lens group in a case where a direction toward the object side of the lens surface closest to the object side in the second lens group is set as a negative direction is Ff2, it is preferable to satisfy Conditional Expression (5), and it is more preferable to satisfy Conditional Expression (5-1).

$-1.2 < Ff2/d < 0$ (5)

$-1.1 < Ff2/d < 0$ (5-1)

In the imaging lens of the present invention, in a state where the object at infinity is in focus, assuming that a distance on the optical axis from a lens surface closest to the object side to a lens surface closest to the image side in the first lens group is dG1, and a sum of the distance on the optical axis from the lens surface closest to the object side to the lens surface closest to the image side and the Bf is TTL, it is preferable to satisfy Conditional Expression (6), and it is more preferable to satisfy Conditional Expression (6-1).

$0.2 < dG1/TTL < 0.5$ (6)

$0.25 < dG1/TTL < 0.4$ (6-1)

In the imaging lens of the present invention, it is preferable that the Abbe number of at least one lens of the lens closest to the object side or the second lens from the object side at the d line is greater than 40 and less than 85.

In the imaging lens of the present invention, in a state where the object at infinity is in focus, assuming that a sum of the distance on the optical axis from the lens surface closest to the object side to the lens surface closest to the image side and the Bf is TTL, and a distance on the optical axis between the first lens group and the second lens group is d, it is preferable to satisfy Conditional Expression (7), and it is more preferable to satisfy Conditional Expression (7-1).

$$4<TTL/d<9 \quad (7)$$

$$4.5<TTL/d<8.5 \quad (7\text{-}1)$$

In the imaging lens of the present invention, in a state where the object at infinity is in focus, assuming that a distance on the optical axis from a lens surface closest to the object side to a lens surface closest to the image side in the first lens group is dG1, and a distance on the optical axis between the first lens group and the second lens group is d, it is preferable to satisfy Conditional Expression (8), and it is more preferable to satisfy Conditional Expression (8-1).

$$1<dG1/d<4 \quad (8)$$

$$1.4<dG1/d<3.5 \quad (8\text{-}1)$$

In the imaging lens of the present invention, in a state where the object at infinity is in focus, assuming that a distance on the optical axis between the first lens group and the second lens group is d, regarding the d and the Bf, it is preferable to satisfy Conditional Expression (9), and it is more preferable to satisfy Conditional Expression (9-1).

$$0.5<Bf/d<3 \quad (9)$$

$$0.7<Bf/d<2 \quad (9\text{-}1)$$

In the imaging lens of the present invention, it is preferable that the first lens group includes at least two negative lenses.

An imaging apparatus of the present invention comprises the imaging lens of the present invention.

In the present description, it should be noted that the term "consists of ~" means that the imaging lens may include not only the above-mentioned elements but also lenses substantially having no refractive powers, optical elements, which are not lenses, such as a stop, a filter, and a cover glass, and mechanism parts such as a lens flange, a lens barrel, an imaging element, and a camera shaking correction mechanism.

In the present specification, it should be noted that the "~ group having a positive refractive power" means that the group has a positive refractive power as a whole. Likewise, the "~ group having a negative refractive power" means that the group has a negative refractive power as a whole. The sign of the refractive power is considered in terms of the paraxial region in a case where an aspheric surface is included. The "lens group" is not necessarily composed of a plurality of lenses, but may be composed of only one lens. The "whole system" means the entire imaging lens. The "Back focal length" is the distance on the optical axis from the lens surface closest to the image side to the image side focal point. All the conditional expressions are based on the d line (a wavelength of 587.6 nm (nanometers)) in a state where an object at infinity is in focus.

According to the present invention, the lens system consists of, in order from the object side, the first lens group, the aperture stop, the second lens group having a positive refractive power. In the lens system, by appropriately setting the behavior during focusing and satisfying the predetermined conditional expressions, it is possible to provide an imaging lens, which can be configured to have a small angle of incidence of the principal ray onto the image plane at the maximum angle of view regardless of an imaging distance, small fluctuation in angle of view caused by focusing, and a small product outer diameter and to have favorable performance, and an imaging apparatus comprising the imaging lens.

BRIEF DESCRIPTION OF THE DRAWINGS

FIG. 1 is a cross-sectional view illustrating a configuration and an optical path of an imaging lens (imaging lens of Example 1 of the present invention) according to an embodiment of the present invention.

FIG. 3 is a cross-sectional view illustrating a configuration and an optical path of an imaging lens of Example 2 of the present invention.

FIG. 4 is a cross-sectional view illustrating a configuration and an optical path of an imaging lens of Example 3 of the present invention.

FIG. 5 is a cross-sectional view illustrating a configuration and an optical path of an imaging lens of Example 4 of the present invention.

FIG. 6 is a cross-sectional view illustrating a configuration and an optical path of an imaging lens of Example 5 of the present invention.

DESCRIPTION OF THE PREFERRED EMBODIMENTS

Figure 2:
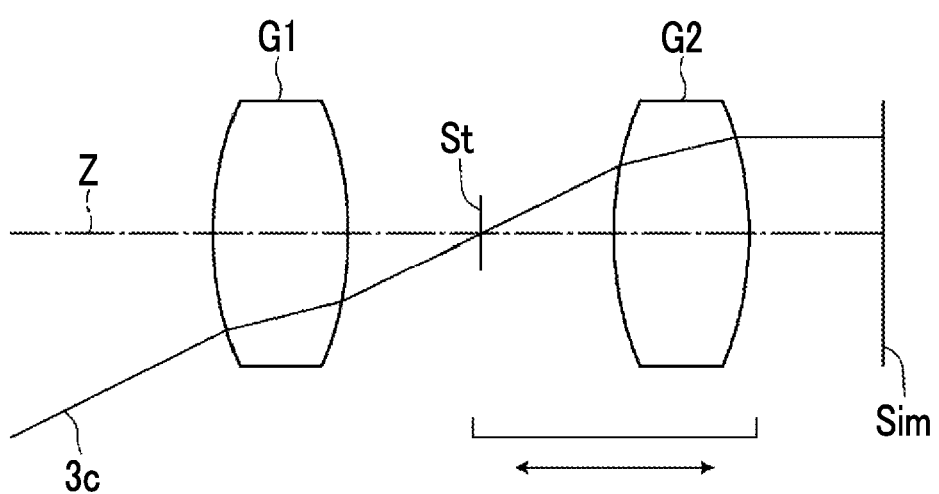
FIG. 2 is a conceptual diagram of an optical system consisting of a first lens group as an afocal system and a second lens group as an image side telecentric system.

Hereinafter, embodiments of the present invention will be described with reference to drawings. FIG. 1 is a cross-sectional view illustrating a configuration and an optical path of an imaging lens according to an embodiment of the present invention. The example shown in FIG. 1 corresponds to the imaging lens of Example 1 to be described later. In FIG. 1, the left side thereof is the object side and the right side thereof is the image side, where on-axis rays 2 and rays with the maximum angle of view 3 are shown as optical paths. In FIG. 1, a state where an object at infinity is in focus is shown in the upper part labeled as "infinity", and a state where a close-range object having an object distance of "0.1 m" is in focus is shown in the lower part labeled as "0.1 m (meters)". It should be noted that the object distance is a distance on the optical axis Z from the lens surface, which is closest to the object side, to the object.

The imaging lens consists of a first lens group G1, an aperture stop St, and a second lens group G2 having a positive refractive power in order from the object side to the image side along the optical axis Z. It should be noted that the aperture stop St shown in FIG. 1 does not necessarily indicate its size and shape, and indicates a position of the stop on the optical axis Z.

In the example of FIG. 1, the first lens group G1 consists of four lenses L11 to L14 in order from the object side to the image side, and the second lens group G2 consists of six lenses L21 to L26 in order from the object side to the image side.

In addition, FIG. 1 shows an example in which an optical member PP having a plane parallel plate shape is disposed between the lens closest to the image side and the image plane Sim. However, the optical member PP may be disposed at a position different from that in the example of FIG. 1, or the optical member PP may be omitted. The optical member PP is assumed to be various filters such as an infrared cut filter and a low pass filter, a cover glass, and the like.

In this imaging lens, the first lens group G1 remains stationary with respect to the image plane Sim during focusing from a distant object to a close-range object, and the aperture stop St and the second lens group G2 integrally move toward the object side. That is, this imaging lens is a rear focus type lens system, and a lens group (hereinafter referred to as a focus lens group) which moves during focusing consists of the aperture stop St and the second lens group G2. By moving the aperture stop St and the second lens group G2 during focusing as described above, fluctuation in off-axis aberration caused by focusing can be suppressed. In FIG. 1, the bracket below the aperture stop St and the second lens group G2 and the arrow pointing to the left indicate that the aperture stop St and the second lens group G2 integrally move toward the object side during focusing from the distant object to the close-range object.

The imaging lens is configured to satisfy all Conditional Expressions (1) to (4).

$$-0.1 < f/f1 < 0.1 \quad (1)$$

$$0.8 < sH/f2 < 1.2 \quad (2)$$

$$0.3 < h1/h2 < 1 \quad (3)$$

$$1.4 < f/(Bf \times (h1/h2)) < 2.5 \quad (4)$$

Here, f is a focal length of the whole system, f1 is a focal length of the first lens group, sH is a distance from the aperture stop to an object side principal point of the second lens group in the direction of the optical axis, f2 is a focal length of the second lens group, h1 is a height of paraxial on-axis rays on the lens surface closest to the object side in the first lens group, h2 is a height of paraxial on-axis rays on a lens surface closest to the image side in the first lens group, and Bf is a back focal length of the whole system at an air-converted distance.

All the reference signs used in the conditional expressions are reference signs in a state where the object at infinity is in focus. FIG. 1 shows the object side principal point H of the second lens group G2. Here, the sign of sH is positive in a case where the object side principal point H of the second lens group G2 is closer to the image side than the aperture stop St, and negative in a case where it is closer to the object side. The h1 and h2 comply with the definition in paraxial ray tracing based on "Optical Technology Series 1 Lens Design Method" (Yoshiya Matsui, Kyoritsu Shuppan Co., Ltd.), pp. 19, (2.10)-(2.12).

By satisfying Conditional Expression (1), the first lens group G1 can be configured as a substantially afocal system. By satisfying Conditional Expression (2), the second lens group G2 can be configured to have high telecentricity on the image side.

Here, in order to facilitate understanding, an optical system will be described with reference to FIG. 2, in which the first lens group G1 is configured as an afocal system, the second lens group G2 is configured to be telecentric on the image side, and the aperture stop St is disposed between the first lens group G1 and the second lens group G2. FIG. 2 is a diagram conceptually showing the optical system. In the optical system shown in FIG. 2, the first lens group G1 is an afocal system. Thus, the tangent of the angle, which is formed by the optical axis Z and the principal ray 3c incident on the first lens group G1 from the object side, and the tangent of the angle, which is formed by the optical axis Z and the principal ray 3c emitted from the first lens group G1 to the image side, is proportional regardless of the angle of incidence. The principal ray 3c emitted from the first lens group G1 passes through the intersection of the aperture stop St and the optical axis, and is incident on the second lens group G2. The second lens group G2 is configured to be telecentric on the image side. Thus, in a case where the principal ray 3c is a ray within the angle of view, the principal ray 3c emitted from the second lens group G2 is parallel to the optical axis Z, regardless of the angle of view of the principal ray 3c incident on the second lens group G2. That is, in the optical system shown in FIG. 2, the angle of incidence of the principal ray 3c to the image plane Sim is necessarily 0°.

In the optical system shown in FIG. 2, as can be seen by retracing the principal ray 3c from the image side to the object side, the principal ray 3c is parallel to the optical axis Z between the second lens group G2 and the image plane Sim. Therefore, even in a case where the focus lens group moves in the direction of the optical axis, the angle formed by the optical axis Z and the principal ray 3c between the first lens group G1 and the second lens group G2 is invariable. Accordingly, the angle formed by the optical axis Z and the principal ray 3c closer to the object side than the first lens group G1 is also invariable. That is, even in a case where the focus lens group moves, the angle of view remains invariable.

In the imaging lens of the present embodiment, by satisfying Conditional Expressions (1) and (2), it is possible to realize the optical system of FIG. 2 or an optical system similar to the optical system of FIG. 2. Consequently, by satisfying Conditional Expressions (1) and (2), it is possible to minimize the angle of incidence of the principal ray to the image plane Sim at the maximum angle of view regardless of the imaging distance, and it is possible to suppress the fluctuation in angle of view caused by focusing.

In addition, in a case of a configuration in which Conditional Expression (1-1) is satisfied instead of Conditional Expression (1), it is possible to obtain more favorable characteristics. Further, in a case of a configuration in which Conditional Expression (2-1) is satisfied instead of Conditional Expression (2), it is possible to obtain more favorable characteristics.

$$-0.06 < f/f1 < 0.06 \quad (1\text{-}1)$$

$$0.85 < sH/f2 < 1.1 \quad (2\text{-}1)$$

The imaging lens is configured to have groups which consist of, in order from the object side to the image side, a first lens group G1 remains stationary during focusing, an aperture stop St, and a second lens group G2 having a positive refractive power. By combining this group configuration and a configuration satisfying Conditional Expression (3), there is an advantage in ensuring the back focal length with a wide-angle lens system, and the angle formed by the optical axis Z and the principal ray incident on the focus lens group at the maximum angle of view becomes small. As a result, it is possible to suppress fluctuation in astigmatism.

In a case where the first lens group G1 is an afocal optical system, h1/h2 in Conditional Expression (3) corresponds to the afocal magnification of the first lens group G1. By not allowing the result of Conditional Expression (3) to be equal to or less than the lower limit, it is possible to prevent change in angle between the rays incident on the first lens group G1 and the rays emitted from the first lens group G1 from becoming excessively large. As a result, it is possible to suppress occurrence of aberrations. By not allowing the result of Conditional Expression (3) to be equal to or greater than the upper limit, the angle formed by the optical axis Z and the principal ray incident on the focus lens group at the maximum angle of view becomes smaller. As a result, it is possible to suppress fluctuation in astigmatism. In addition, in a case of a configuration in which Conditional Expression (3-1) is satisfied instead of Conditional Expression (3), it is possible to obtain more favorable characteristics.

$$0.35 < h1/h2 < 0.8 \quad (3\text{-}1)$$

By not allowing the result of Conditional Expression (4) to be equal to or less than the lower limit, there is an advantage in reducing the product outer diameter. By not allowing the result of Conditional Expression (4) to be equal to or greater than the upper limit, it becomes easy to ensure the back focal length while reducing the F number. In addition, in a case of a configuration in which Conditional Expression (4-1) is satisfied instead of Conditional Expression (4), it is possible to obtain more favorable characteristics.

$$1.55 < f/(Bf \times (h1/h2)) < 2 \quad (4\text{-}1)$$

It is preferable that the first lens group G1 includes at least two negative lenses. In such a case, it becomes easy to suppress occurrence of distortion and lateral chromatic aberration.

It is preferable that an Abbe number of at least one lens of a lens closest to the object side or the second lens from the object side at the d line is greater than 40. In such a case, it is possible to suppress occurrence of lateral chromatic aberration. Further, it is more preferable that the Abbe number of at least one lens of the lens closest to the object side or the second lens from the object side at the d line is greater than 40 and less than 85. By selecting an optical material whose Abbe number is less than 85 from the existing optical materials, the refractive index of the lens is prevented from becoming excessively low, and there is an advantage in correcting distortion.

Further, it is preferable that the imaging lens satisfies at least one of Conditional Expressions (5) to (12).

$$-1.2 < Ff2/d < 0 \quad (5)$$

$$0.2 < dG1/TTL < 0.5 \quad (6)$$

$$4 < TTL/d < 9 \quad (7)$$

$$1 < dG1/d < 4 \quad (8)$$

$$0.5 < Bf/d < 3 \quad (9)$$

$$1 < Bf/(f \times \tan(\omega max)) < 3 \quad (10)$$

$$0 < (f \times \tan(\omega max))/d < 1.1 \quad (11)$$

$$8 < TTL/(f \times \tan(\omega max)) < 11 \quad (12)$$

Here, Ff2 is an air-converted distance on the optical axis from a lens surface closest to the object side in the second lens group to an object side focal point of the second lens group, d is a distance on the optical axis between the first lens group and the second lens group, dG1 is a distance on the optical axis from a lens surface closest to the object side to a lens surface closest to the image side in the first lens group, TTL is a sum of the distance on the optical axis from the lens surface closest to the object side to the lens surface closest to the image side and the Bf, and ωmax is a maximum half angle of view.

All the reference signs used in the conditional expressions are reference signs in a state where the object at infinity is in focus. The sign of Ff2 is positive in a case where the object side focal point of the second lens group G2 is on the image side of the lens surface closest to the object side in the second lens group, and negative in a case where it is on the object side. ωmax is a half value of the maximum total angle of view. In the example of FIG. 2, the angle, which is formed by the optical axis Z and the principal ray indicated by the chain line among the rays with the maximum angle of view 3 at a position closer to the object side than the lens L11, corresponds to ωmax.

Hereinafter, each of the above conditional expressions will be described. Ff2 in Conditional Expression (5) corresponds to the front focus of the second lens group G2. In the lens system in which the aperture stop St is disposed between the first lens group G1 and the second lens group G2, by not allowing the result of Conditional Expression (5) to be equal to or less than the lower limit, the angle of incidence of the principal ray on the image plane Sim at the maximum angle of view is set to be not large on one of the negative side or the positive side. By not allowing the result of Conditional Expression (5) to be equal to or greater than the upper limit, the angle of incidence of the principal ray on the image plane Sim at the maximum angle of view is set to be not large on the other one. Therefore, it is possible to ensure telecentricity on the image side. In addition, in a case of a configuration in which Conditional Expression (5-1) is satisfied, it is possible to obtain more favorable characteristics.

$$-1.1 < Ff2/d < 0 \quad (5\text{-}1)$$

By not allowing the result of Conditional Expression (6) to be equal to or less than the lower limit, there is an advantage in ensuring an afocal magnification of the first lens group G1. By not allowing the result of Conditional Expression (6) to be equal to or greater than the upper limit, it is possible to ensure the height of off-axis rays incident on the second lens group G2, and it is possible to ensure the amount of movement of the focus lens group. In addition, in a case of a configuration in which Conditional Expression (6-1) is satisfied, it is possible to obtain more favorable characteristics.

$$0.25 < dG1/TTL < 0.4 \quad (6\text{-}1)$$

By not allowing the result of Conditional Expression (7) to be equal to or less than the lower limit, it is possible to ensure the length of the lens system required for satisfactory aberration correction in the direction of the optical axis. By not allowing the result of Conditional Expression (7) to be equal to or greater than the upper limit, it is possible to prevent the lens diameter from becoming excessively large since the total length of the lens system becomes excessively long. Further, by not allowing the result of Conditional Expression (7) to be equal to or greater than the upper limit, the amount of movement of the focus lens group can be ensured. In addition, in a case of a configuration in which Conditional Expression (7-1) is satisfied, it is possible to obtain more favorable characteristics.

$$4.5 < TTL/d < 8.5 \quad (7\text{-}1)$$

By not allowing the result of Conditional Expression (8) to be equal to or less than the lower limit, there is an advantage in ensuring an afocal magnification of the first lens group G1. By not allowing the result of Conditional Expression (8) to be equal to or greater than the upper limit, the amount of movement of the focus lens group can be ensured. In addition, in a case of a configuration in which Conditional Expression (8-1) is satisfied, it is possible to obtain more favorable characteristics.

$$1.4 < dG1/d < 3.5 \quad (8\text{-}1)$$

By not allowing the result of Conditional Expression (9) to be equal to or less than the lower limit, it is possible to ensure a distance between the imaging lens and the imaging element, and it becomes easy to construct a mechanical structure in the imaging apparatus. By not allowing the result of Conditional Expression (9) to be equal to or greater than the upper limit, the amount of movement of the focus lens group can be ensured. In addition, in a case of a configuration in which Conditional Expression (9-1) is satisfied, it is possible to obtain more favorable characteristics.

$$0.7 < Bf/d < 2 \quad (9\text{-}1)$$

By not allowing the result of Conditional Expression (10) to be equal to or less than the lower limit, it is possible to ensure a distance between the imaging lens and the imaging element, and it becomes easy to construct a mechanical structure of the mount section. By not allowing the result of Conditional Expression (10) to be equal to or greater than the upper limit, the total length of the lens system can be prevented from becoming excessively long.

As for the lower limit of Conditional Expression (11), f, tan ωmax, and d are positive values, and thus 0<(f×tan (ωmax))/d. By not allowing the result of Conditional Expression (11) to be equal to or greater than the upper limit, the amount of movement of the focus lens group can be ensured.

By not allowing the result of Conditional Expression (12) to be equal to or less than the lower limit, there is an advantage in ensuring a sufficient back focal length and a sufficient amount of movement of the focus lens group. By not allowing the result of Conditional Expression (12) to be equal to or greater than the upper limit, the total length of the lens system is prevented from becoming excessively long. Thus, it is possible to minimize the effective diameter of the lens closest to the object side or the effective diameter of the lens closest to the image side. As a result, there is an advantage in reducing the product outer diameter of the imaging lens.

The above-mentioned preferred configurations and available configurations may be optional combinations, and it is preferable to selectively adopt the configurations in accordance with required specification. According to the present embodiment, it is possible to realize an imaging lens, which can be configured to have a small angle of incidence of the principal ray onto the image plane Sim at the maximum angle of view regardless of an imaging distance, small fluctuation in angle of view caused by focusing, and a small product outer diameter and to have favorable performance. It should be noted that "the angle of incidence of the principal ray onto the image plane Sim" is an angle formed by the principal ray and the normal line of the image plane Sim. Further, the term "the small angle of incidence of the principal ray onto the image plane Sim at the maximum angle of view" means that the angle formed by the perpendicular of the image plane Sim and the principal ray at the maximum angle of view is in a range of −5° to +5°.

Next, numerical examples of the imaging lens of the present invention will be described.

Example 1

FIG. 1 shows a cross-sectional view of an imaging lens of Example 1, and an illustration method thereof is as described above. Therefore, repeated description is partially omitted herein. The imaging lens of Example 1 consists of, in order from the object side to the image side, a first lens group G1 having a negative refractive power, an aperture stop St, and a second lens group G2 having a positive refractive power. The first lens group G1 remains stationary with respect to the image plane Sim during focusing from a distant object to a close-range object, and the aperture stop St and the second lens group G2 integrally move toward the object side. The first lens group G1 consists of four lenses L11 to L14 in order from the object side to the image side, and the second lens group G2 consists of six lenses L21 to L26 in order from the object side to the image side.

Table 1 shows basic lens data of the imaging lens of Example 1, Table 2 shows specification and variable surface distances, and Table 3 shows aspheric surface coefficients thereof. In Table 1, the column of the surface number shows surface numbers. The surface closest to the object side is the first surface, and the surface numbers increase one by one toward the image side. The column of R shows radii of curvature of the respective surfaces. The column of D shows surface distances on the optical axis between the respective surfaces and the surfaces adjacent to the image side. Further, the column of Nd shows refractive indexes of the respective components at the d line (a wavelength of 587.6 nm (nanometers)), and the column of νd shows Abbe numbers of the respective components at the d line.

In Table 1, reference signs of radii of curvature of surface shapes convex toward the object side are set to be positive, and reference signs of radii of curvature of surface shapes convex toward the image side are set to be negative. Table 1 additionally shows the aperture stop St and the optical member PP. In Table 1, in a place of a surface number of a surface corresponding to the aperture stop St, the surface number and a term of (St) are noted. A value at the bottom place of D in Table 1 indicates a distance between the image plane Sim and the surface closest to the image side in the table. In Table 1, the variable surface distances are referenced by the reference signs DD[ ], and are written into places of D, where object side surface numbers of distances are noted in [ ].

Table 2 shows the focal length f of the whole system in a state where the object at infinity is in focus, the focal length fnear of the whole system in a state where an object having an object distance of 0.1 m (meters) is in focus, and the back focal length Bf of the whole system at the air-converted distance in the state where the object at infinity is in focus. In Table 2, values of the F number FNo., the maximum total angle of view 2ω, and the variable surface distance in the state where the object at infinity is in focus and the state where the object having the object distance of 0.1 m (meters) is in focus are based on the d line. (°) in the place of 2ω indicates that the unit thereof is a degree. In Table 2, the column denoted by the "infinity" shows respective values thereof in a state where the object at infinity is in focus, and the column denoted by "0.1 m" shows respective values thereof in a state where an object at an object distance of 0.1 m (meters) is in focus.

In Table 1, the reference sign * is attached to surface numbers of aspheric surfaces, and numerical values of the paraxial radius of curvature are written into the column of the radius of curvature of the aspheric surface. Table 3 shows surface numbers of the aspheric surfaces, and aspheric surface coefficients of the respective aspheric surfaces. The "E±n" (n: an integer) in numerical values of the aspheric surface coefficients of Table 3 indicates "×10$^{±n}$". The aspheric surface coefficients are values of the coefficients KA and Am (m=3, 4, 5, . . . ) in aspheric surface expression represented as the following expression.

$$Zd = C \times h^2 / \{1 + (1 - KA \times C^2 \times h^2)^{1/2}\} + \Sigma Am \times h^m$$

Here, Zd is an aspheric surface depth (a length of a perpendicular from a point on an aspheric surface at height h to a plane that is perpendicular to the optical axis and contacts with the vertex of the aspheric surface), h is a height (a distance from the optical axis to the lens surface), C is a paraxial curvature, KA and Am are aspheric surface coefficients, and Σ in the aspheric surface expression means the sum with respect to m.

In data of each table, a degree is used as a unit of an angle, and mm (millimeter) is used as a unit of a length, but appropriate different units may be used since the optical system can be used even in a case where the system is enlarged or reduced in proportion. Further, each of the following tables shows numerical values rounded off to predetermined decimal places.

TABLE 1

Example 1

| Surface Number | R | D | Nd | νd |
|---|---|---|---|---|
| 1 | 15.49320 | 2.000 | 1.85000 | 22.73 |
| 2 | 9.63677 | 3.714 | | |
| *3 | 34.50672 | 2.000 | 1.56867 | 58.27 |
| *4 | 9.19393 | 6.907 | | |
| 5 | −13.79885 | 2.318 | 1.59522 | 67.73 |
| 6 | −22.95501 | 0.825 | | |
| 7 | 40.04317 | 3.774 | 1.85001 | 33.64 |
| 8 | −30.43609 | DD[8] | | |
| 9(St) | ∞ | 2.463 | | |
| 10 | 94.57214 | 2.652 | 1.81626 | 46.37 |
| 11 | −32.98245 | 0.200 | | |
| 12 | 36.63451 | 0.900 | 1.62851 | 53.90 |
| 13 | 16.17848 | 0.443 | | |
| 14 | 23.34929 | 5.964 | 1.49700 | 81.54 |
| 15 | −10.04173 | 1.000 | 1.85001 | 22.50 |
| 16 | −16.17434 | 3.196 | | |
| 17 | −16.74115 | 1.000 | 1.81158 | 24.42 |
| 18 | 209.72080 | 7.362 | | |
| *19 | 34.58466 | 6.500 | 1.69098 | 52.95 |
| *20 | −19.76736 | DD[20] | | |
| 21 | ∞ | 1.000 | 1.51633 | 64.14 |
| 22 | ∞ | 6.883 | | |

TABLE 2

Example 1

| | Infinity | 0.1 m |
|---|---|---|
| f | 12.309 | — |
| fnear | — | 12.330 |
| Bf | 12.543 | — |
| FNo. | 2.81 | 2.83 |
| 2ω(°) | 73.8 | 73.8 |
| DD[8] | 9.306 | 7.965 |
| DD[20] | 5.000 | 6.341 |

TABLE 3

Example 1

| Surface Number | 3 | 4 | 19 | 20 |
|---|---|---|---|---|
| KA | 1.0000000E+00 | 1.0000000E+00 | 1.0000000E+00 | 1.0000000E+00 |
| A3 | −1.3552527E−18 | 0.0000000E+00 | −6.2743181E−20 | −2.5097273E−20 |
| A4 | 3.9355827E−04 | 2.9542696E−04 | −1.2322284E−05 | 6.6407840E−05 |
| A5 | 6.9337766E−05 | 1.6913579E−04 | −7.0252476E−06 | −1.4190657E−05 |
| A6 | −2.8850279E−05 | −4.7448467E−05 | −2.4685147E−07 | −1.5315236E−06 |
| A7 | 1.2611101E−06 | −3.3372287E−06 | 3.9212906E−07 | 1.0545097E−06 |
| A8 | 4.9225199E−07 | 2.1864220E−06 | −1.7491411E−08 | −3.2226118E−08 |
| A9 | −4.5212614E−08 | −5.2763019E−08 | −1.2389531E−08 | −3.3849190E−08 |
| A10 | −4.6895954E−09 | −5.1942602E−08 | 1.1712211E−09 | 2.6734060E−09 |
| A11 | 5.7076506E−10 | 3.3892228E−09 | 2.1626782E−10 | 6.0024405E−10 |
| A12 | 3.0053952E−11 | 6.6701277E−10 | −2.7580930E−11 | −6.3465563E−11 |
| A13 | −3.8999669E−12 | −5.8100836E−11 | −2.2517787E−12 | −6.3186032E−12 |
| A14 | −1.5727290E−13 | −4.9719701E−12 | 3.5040235E−13 | 7.8747359E−13 |
| A15 | 1.5296232E−14 | 4.7252810E−13 | 1.3943471E−14 | 3.9336972E−14 |
| A16 | 6.7172302E−16 | 2.0550507E−14 | −2.5542034E−15 | −5.5122528E−15 |
| A17 | −3.2320973E−17 | −1.8903793E−15 | −4.7363586E−17 | −1.3393439E−16 |
| A18 | −1.7901424E−18 | −3.8925702E−17 | 1.0070367E−17 | 2.0642013E−17 |
| A19 | 2.8482993E−20 | 2.9978334E−18 | 6.7898086E−20 | 1.9240071E−19 |
| A20 | 2.0045261E−21 | 1.5183364E−20 | −1.6659363E−20 | −3.2212415E−20 |

Figure 7:
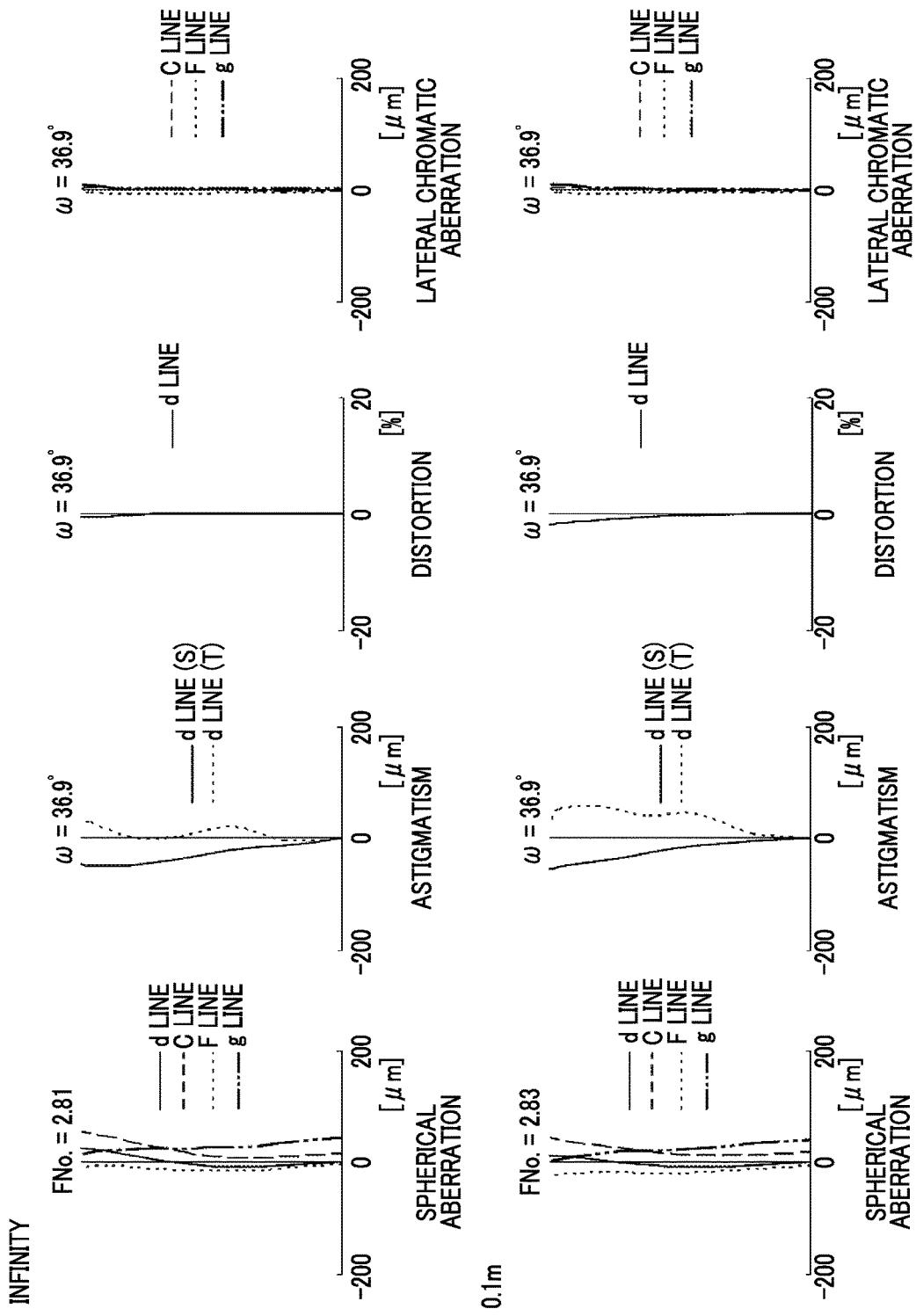
FIG. 7 is a diagram of aberrations of the imaging lens of Example 1 of the present invention.

FIG. 7 shows a diagram of aberrations of the imaging lens of Example 1. In FIG. 7, in order from the left side, spherical aberration, astigmatism, distortion, and lateral chromatic aberration are shown. In FIG. 7, a state where an object at infinity is in focus is shown in the upper part labeled as "infinity", and a state where a close-range object having an object distance of "0.1 m" is in focus is shown in the lower part labeled as "0.1 m (meters)". In the spherical aberration diagram, aberrations at the d line (a wavelength of 587.6 nm (nanometers)), the C line (a wavelength of 656.3 nm (nanometers)), the F line (a wavelength of 486.1 nm (nanometers)), and the g line (a wavelength of 435.8 nm (nanometers)) are respectively indicated by the solid line, the long dashed line, the short dashed line, and the chain double-dashed line. In the astigmatism diagram, aberration in the sagittal direction at the d line is indicated by the solid line, and aberration in the tangential direction at the d line is indicated by the short dashed line. In the distortion diagram, aberration at the d line is indicated by the solid line. In the lateral chromatic aberration diagram, aberrations at the C line, the F line, and the g line are respectively indicated by the long dashed line, the short dashed line, and the chain double-dashed line. In the spherical aberration diagram, FNo. indicates an F number. In the other aberration diagrams, ω indicates a half angle of view.

The symbols, the meanings, the description method, and the illustration method of each data relating to the above-mentioned imaging lens of Example 1 are the same in Examples unless otherwise specified. Therefore, repeated examples will be omitted below.

Example 2

Figure 8:
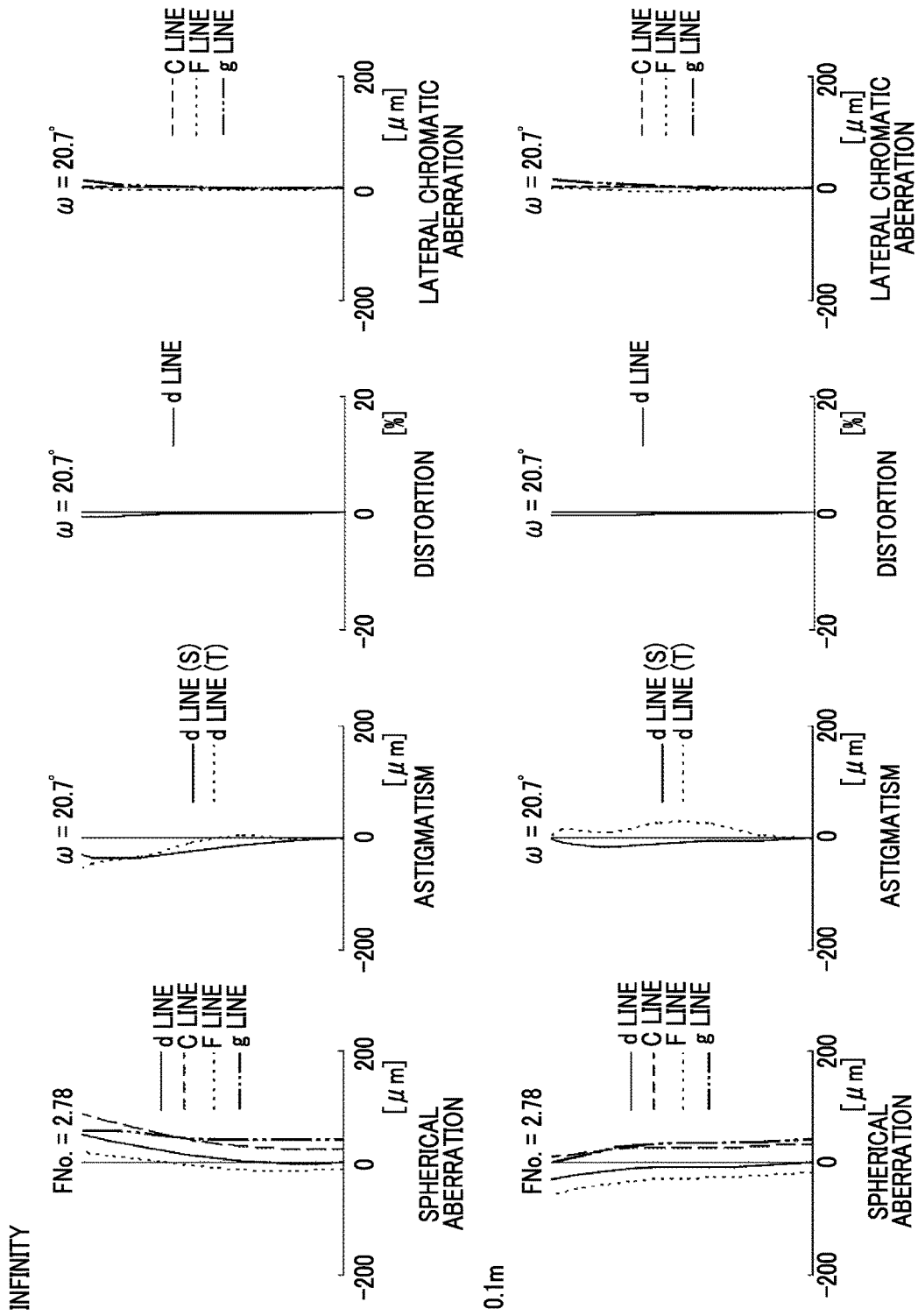
FIG. 8 is a diagram of aberrations of the imaging lens of Example 2 of the present invention.

FIG. 3 is a cross-sectional view of an imaging lens of Example 2. The imaging lens of Example 2 consists of, in order from the object side to the image side, a first lens group G1 having a negative refractive power, an aperture stop St, and a second lens group G2 having a positive refractive power. The first lens group G1 remains stationary with respect to the image plane Sim during focusing from a distant object to a close-range object, and the aperture stop St and the second lens group G2 integrally move toward the object side. The first lens group G1 consists of five lenses L11 to L15 in order from the object side to the image side, and the second lens group G2 consists of six lenses L21 to L26 in order from the object side to the image side. Table 4 shows basic lens data of the imaging lens of Example 2, Table 5 shows specification and variable surface distances, Table 6 shows aspheric surface coefficients, and FIG. 8 shows aberration diagrams.

TABLE 4

Example 2

| Surface Number | R | D | Nd | νd |
|---|---|---|---|---|
| 1 | −920.32691 | 1.800 | 1.48749 | 70.24 |
| 2 | 14.56224 | 6.553 | | |
| 3 | 42.62653 | 3.448 | 1.69714 | 56.64 |
| 4 | −35.96338 | 3.152 | | |
| 5 | −28.40561 | 1.300 | 1.59973 | 38.03 |
| 6 | 22.70481 | 1.000 | | |
| 7 | 27.48814 | 4.605 | 1.79999 | 48.00 |
| 8 | −14.60566 | 1.312 | 1.55829 | 44.07 |
| 9 | 65.92328 | DD[9] | | |
| 10(St) | ∞ | 2.500 | | |

TABLE 4-continued

Example 2

| Surface Number | R | D | Nd | νd |
|---|---|---|---|---|
| 11 | 30.65292 | 2.506 | 1.79999 | 27.23 |
| 12 | −111.24384 | 2.638 | | |
| 13 | 18.16352 | 2.833 | 1.56321 | 43.15 |
| 14 | 11.37307 | 3.500 | | |
| 15 | ∞ | 4.636 | 1.49700 | 81.61 |
| 16 | −9.49637 | 1.000 | 1.86826 | 21.59 |
| 17 | −835.50956 | 5.904 | | |
| 18 | −21.08084 | 3.342 | 1.89401 | 38.60 |
| 19 | −15.20987 | 0.300 | | |
| *20 | 64.62855 | 4.658 | 1.80348 | 40.45 |
| *21 | −45.02296 | DD[21] | | |
| 22 | ∞ | 1.000 | 1.51633 | 64.14 |
| 23 | ∞ | 14.352 | | |

TABLE 5

Example 2

| | Infinity | 0.1 m |
|---|---|---|
| f | 24.522 | — |
| fnear | — | 24.535 |
| Bf | 20.012 | — |
| FNo. | 2.78 | 2.78 |
| 2ω(°) | 41.4 | 41.4 |
| DD[9] | 8.012 | 2.764 |
| DD[21] | 5.000 | 10.248 |

TABLE 6

Example 2

| Surface Number | 20 | 21 |
|---|---|---|
| KA | 1.0000000E+00 | 1.0000000E+00 |
| A3 | 3.3306691E−20 | 1.6653345E−20 |
| A4 | −1.3787514E−06 | −8.4134939E−07 |
| A5 | −6.0741244E−06 | −4.3751197E−06 |
| A6 | 7.2702382E−07 | 2.8685558E−07 |
| A7 | 7.2942088E−08 | 9.3256132E−08 |
| A8 | −1.9065327E−08 | −1.2754837E−08 |
| A9 | 7.8876550E−12 | −6.9574840E−10 |
| A10 | 1.9803510E−10 | 1.6376365E−10 |
| A11 | −6.0417744E−12 | 4.0355928E−13 |
| A12 | −9.5317863E−13 | −9.0654578E−13 |
| A13 | 4.2609183E−14 | 1.6951690E−14 |
| A14 | 1.8325306E−15 | 1.9460777E−15 |
| A15 | −9.2863835E−17 | −5.5618455E−17 |
| A16 | 0.0000000E+00 | 0.0000000E+00 |
| A17 | 0.0000000E+00 | 0.0000000E+00 |
| A18 | 0.0000000E+00 | 0.0000000E+00 |
| A19 | 0.0000000E+00 | 0.0000000E+00 |
| A20 | 0.0000000E+00 | 0.0000000E+00 |

Example 3

Figure 9:
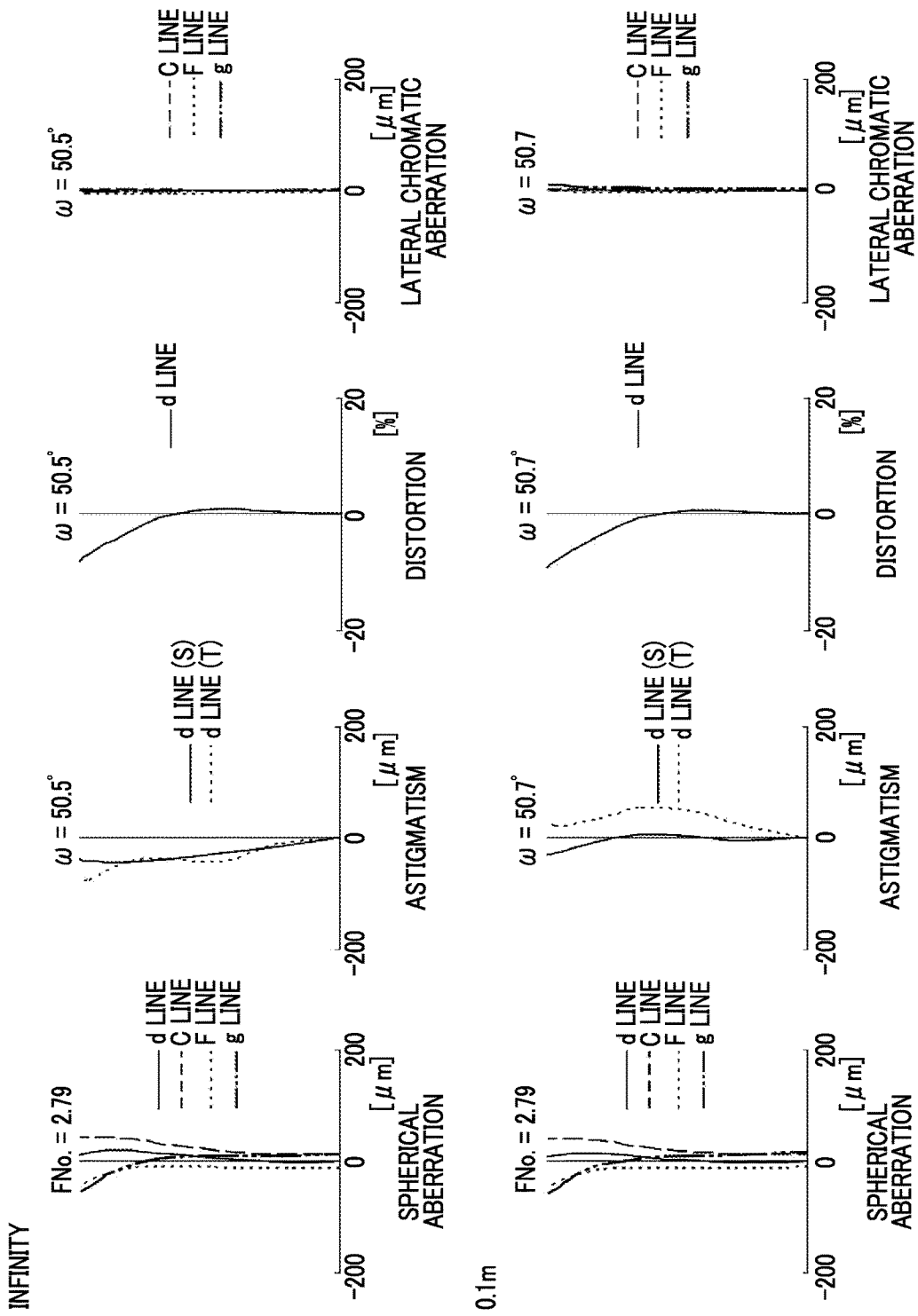
FIG. 9 is a diagram of aberrations of the imaging lens of Example 3 of the present invention.

FIG. 4 is a cross-sectional view of an imaging lens of Example 3. The imaging lens of Example 3 consists of, in order from the object side to the image side, a first lens group G1 having a positive refractive power, an aperture stop St, and a second lens group G2 having a positive refractive power. The first lens group G1 remains stationary with respect to the image plane Sim during focusing from a distant object to a close-range object, and the aperture stop St and the second lens group G2 integrally move toward the object side. The first lens group G1 consists of seven lenses L11 to L17 in order from the object side to the image side, and the second lens group G2 consists of six lenses L21 to L26 in order from the object side to the image side. Table 7 shows basic lens data of the imaging lens of Example 3, Table 8 shows specification and variable surface distances, Table 9 shows aspheric surface coefficients, and FIG. 9 shows aberration diagrams.

TABLE 8

Example 3

|  | Infinity | 0.1 m |
|---|---|---|
| f | 8.244 | — |
| fnear | — | 8.232 |
| Bf | 12.515 | — |
| FNo. | 2.79 | 2.79 |
| 2ω(°) | 101.0 | 101.4 |
| DD[13] | 2.520 | 1.923 |
| DD[24] | 5.000 | 5.597 |

TABLE 9

Example 3

| Surface Number | 3 | 4 | 23 | 24 |
|---|---|---|---|---|
| KA | 1.0000000E+00 | 1.0000000E+00 | 1.0000000E+00 | 1.0000000E+00 |
| A3 | 0.0000000E+00 | 0.0000000E+00 | 0.0000000E+00 | 0.0000000E+00 |
| A4 | 1.1711942E−03 | 1.2272858E−03 | 1.0542657E−06 | 2.5094717E−05 |
| A5 | 3.2692969E−05 | 1.2917096E−04 | −5.9240790E−06 | −8.0239367E−06 |
| A6 | −7.4867099E−05 | −8.9939747E−05 | −2.4559309E−06 | −3.1022725E−07 |
| A7 | 1.0840845E−05 | −1.2194867E−05 | 7.1864435E−07 | −1.4527491E−08 |
| A8 | 4.6637371E−07 | 8.8047176E−06 | −4.5140169E−08 | 1.7533601E−10 |
| A9 | −2.0436275E−07 | −3.3096153E−07 | −2.9675997E−09 | 2.5486277E−10 |
| A10 | 1.1771448E−09 | −2.7679652E−07 | 9.2717041E−11 | 4.5714608E−11 |
| A11 | 2.1169072E−09 | 1.7019673E−08 | −2.3732570E−10 | 4.4578464E−12 |
| A12 | −2.6971186E−11 | 4.8090342E−09 | 7.9773223E−11 | 2.7115305E−13 |
| A13 | −1.2596588E−11 | −2.1421560E−10 | −5.0440353E−12 | 2.3325936E−14 |
| A14 | 6.8664075E−14 | −4.8488866E−11 | −8.5032836E−13 | −3.5555012E−16 |
| A15 | 3.1717031E−14 | 9.9181869E−13 | 1.9796596E−13 | −1.2068916E−15 |
| A16 | −3.0886273E−16 | 1.1160816E−13 | −2.1031463E−14 | 4.6047448E−17 |
| A17 | 2.4785896E−17 | −2.0750252E−14 | 1.2678276E−15 | −6.7151325E−18 |
| A18 | 4.8195569E−18 | 4.0740169E−15 | −3.2536419E−17 | 8.2057632E−19 |
| A19 | 1.2319623E−18 | 4.8963979E−16 | 0.0000000E+00 | 0.0000000E+00 |
| A20 | −1.3644274E−19 | −6.4663177E−17 | 0.0000000E+00 | 0.0000000E+00 |

TABLE 7

Example 3

| Surface Number | R | D | Nd | vd |
|---|---|---|---|---|
| 1 | 37.17896 | 4.000 | 1.58481 | 66.95 |
| 2 | 12.86691 | 5.401 |  |  |
| *3 | 69.70199 | 2.285 | 1.56867 | 58.27 |
| *4 | 11.35606 | 4.548 |  |  |
| 5 | −57.75121 | 2.307 | 1.49700 | 81.54 |
| 6 | 15.66322 | 1.403 |  |  |
| 7 | 36.43904 | 1.300 | 1.92000 | 19.99 |
| 8 | 7.05840 | 5.207 | 1.68714 | 30.92 |
| 9 | −24.97000 | 0.800 |  |  |
| 10 | −11.58645 | 0.950 | 1.61493 | 62.32 |
| 11 | −37.87944 | 0.386 |  |  |
| 12 | 26.21322 | 3.500 | 1.72539 | 28.73 |
| 13 | −18.30061 | DD[13] |  |  |
| 14(St) | ∞ | 7.671 |  |  |
| 15 | 25.77919 | 1.200 | 1.89309 | 38.69 |
| 16 | 10.55683 | 4.610 | 1.49700 | 81.54 |
| 17 | −25.77649 | 3.704 |  |  |
| 18 | 28.75173 | 1.100 | 1.78273 | 37.08 |
| 19 | 13.18996 | 6.447 | 1.49700 | 81.54 |
| 20 | −19.33384 | 1.000 |  |  |
| 21 | −24.21110 | 1.000 | 1.81515 | 24.24 |
| 22 | −100.10752 | 2.549 |  |  |
| *23 | 39.55585 | 4.504 | 1.69098 | 52.95 |
| *24 | −60.34343 | DD[24] |  |  |
| 25 | ∞ | 1.000 | 1.51633 | 64.14 |
| 26 | ∞ | 6.856 |  |  |

Example 4

Figure 10:
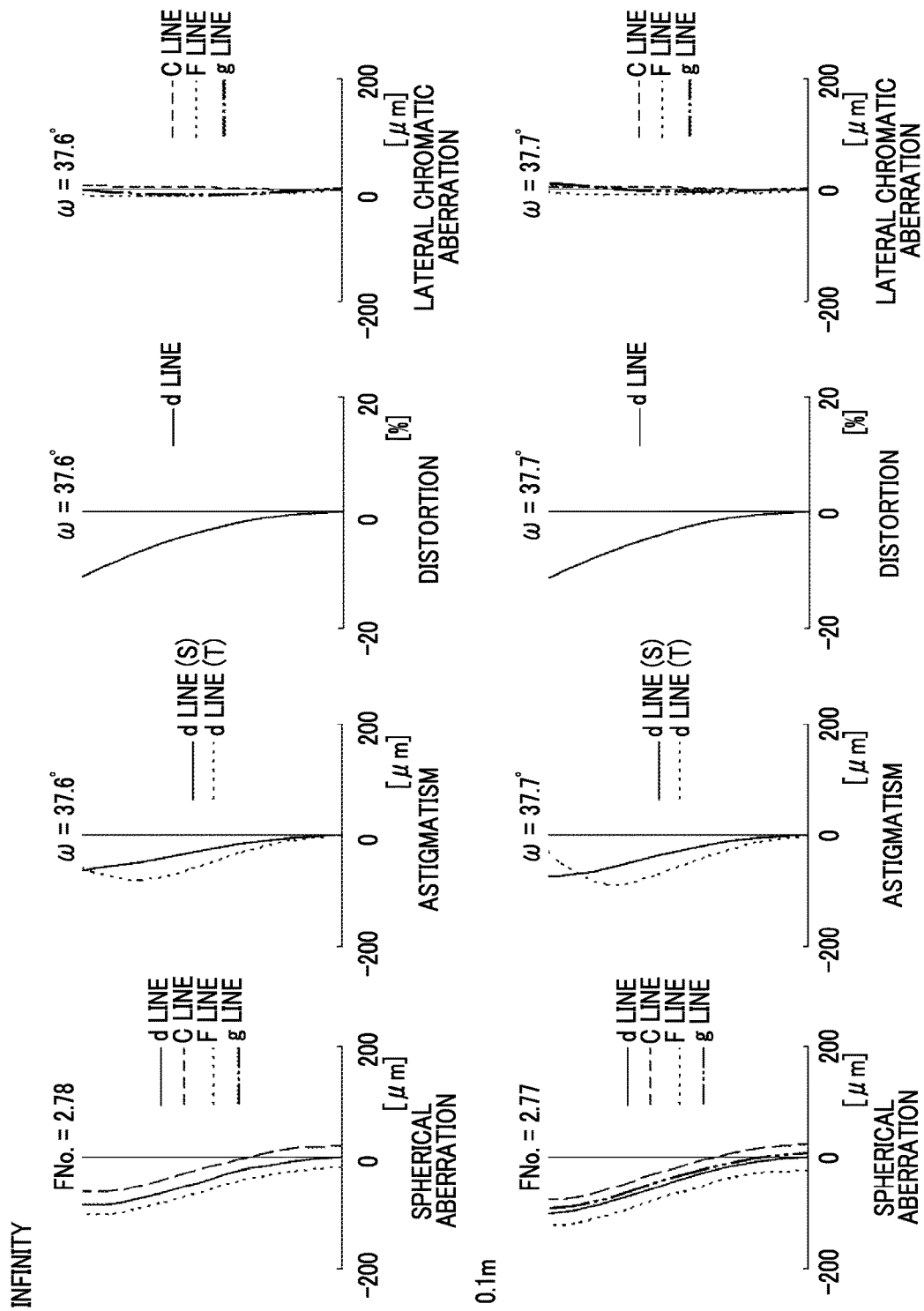
FIG. 10 is a diagram of aberrations of the imaging lens of Example 4 of the present invention.

FIG. 5 is a cross-sectional view of an imaging lens of Example 4. The imaging lens of Example 4 consists of, in order from the object side to the image side, a first lens group G1 having a positive refractive power, an aperture stop St, and a second lens group G2 having a positive refractive power. The first lens group G1 remains stationary with respect to the image plane Sim during focusing from a distant object to a close-range object, and the aperture stop St and the second lens group G2 integrally move toward the object side. The first lens group G1 consists of three lenses L11 to L13 in order from the object side to the image side, and the second lens group G2 consists of three lenses L21 to L23 in order from the object side to the image side. Table 10 shows basic lens data of the imaging lens of Example 4, Table 11 shows specification and variable surface distances, and FIG. 10 shows aberration diagrams thereof.

TABLE 10

Example 4

| Surface Number | R | D | Nd | vd |
|---|---|---|---|---|
| 1 | 12.92350 | 2.000 | 1.84999 | 43.00 |
| 2 | 5.53636 | 3.211 |  |  |
| 3 | −229.19617 | 4.000 | 1.68117 | 34.06 |
| 4 | 9.90439 | 1.082 |  |  |

TABLE 10-continued

Example 4

| Surface Number | R | D | Nd | vd |
|---|---|---|---|---|
| 5 | 31.73499 | 8.443 | 1.53726 | 56.41 |
| 6 | −8.49124 | DD[6] | | |
| 7(St) | ∞ | 10.084 | | |
| 8 | 376.68267 | 6.291 | 1.59522 | 67.73 |
| 9 | −21.94510 | 8.480 | | |
| 10 | 23.81866 | 4.878 | 1.62358 | 60.25 |
| 11 | −13.45204 | 0.200 | | |
| 12 | −12.93746 | 1.253 | 1.95906 | 17.47 |
| 13 | −30.44913 | DD[13] | | |
| 14 | ∞ | 1.000 | 1.51633 | 64.14 |
| 15 | ∞ | 5.345 | | |

TABLE 11

Example 4

| | Infinity | 0.1 m |
|---|---|---|
| f | 8.384 | — |
| fnear | — | 8.380 |
| Bf | 11.005 | — |
| FNo. | 2.78 | 2.77 |
| 2ω(°) | 75.2 | 75.4 |
| DD[6] | 3.101 | 2.450 |
| DD[13] | 5.000 | 5.651 |

Example 5

Figure 11:
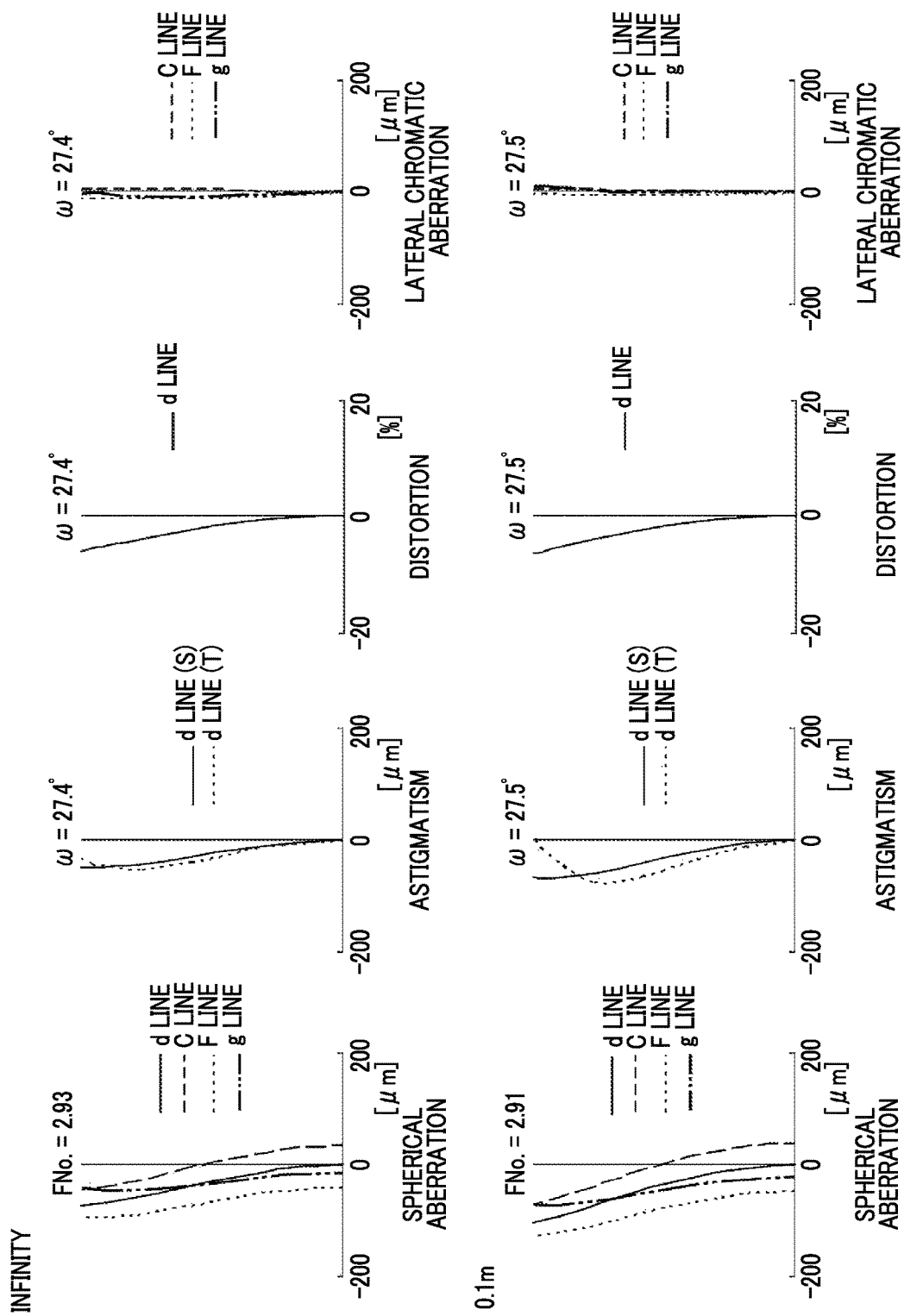
FIG. 11 is a diagram of aberrations of the imaging lens of Example 5 of the present invention.

FIG. 6 is a cross-sectional view of an imaging lens of Example 5. The imaging lens of Example 5 consists of, in order from the object side to the image side, a first lens group G1 having a positive refractive power, an aperture stop St, and a second lens group G2 having a positive refractive power. The first lens group G1 remains stationary with respect to the image plane Sim during focusing from a distant object to a close-range object, and the aperture stop St and the second lens group G2 integrally move toward the object side. The first lens group G1 consists of three lenses L11 to L13 in order from the object side to the image side, and the second lens group G2 consists of three lenses L21 to L23 in order from the object side to the image side. Table 12 shows basic lens data of the imaging lens of Example 5, Table 13 shows specification and variable surface distances, and FIG. 11 shows aberration diagrams thereof.

TABLE 12

Example 5

| Surface Number | R | D | Nd | vd |
|---|---|---|---|---|
| 1 | 14.89012 | 3.963 | 1.74973 | 53.03 |
| 2 | 5.98656 | 7.215 | | |
| 3 | −15.44849 | 2.754 | 1.85000 | 22.50 |
| 4 | 14.52154 | 3.464 | 1.85000 | 30.08 |
| 5 | −11.20047 | DD[5] | | |
| 6(St) | ∞ | 8.066 | | |
| 7 | 254.13045 | 6.176 | 1.59522 | 67.73 |
| 8 | −26.22255 | 11.914 | | |
| 9 | 31.53699 | 4.200 | 1.76740 | 51.26 |
| 10 | −15.72009 | 0.540 | | |
| 11 | −14.06175 | 1.000 | 1.95906 | 17.47 |
| 12 | −34.20829 | DD[12] | | |
| 13 | ∞ | 1.000 | 1.51633 | 64.14 |
| 14 | ∞ | 5.360 | | |

TABLE 13

Example 5

| | Infinity | 0.1 m |
|---|---|---|
| f | 11.792 | — |
| fnear | — | 11.783 |
| Bf | 11.020 | — |
| FNo. | 2.93 | 2.91 |
| 2ω(°) | 54.8 | 55.0 |
| DD[5] | 3.727 | 2.474 |
| DD[12] | 5.000 | 6.253 |

Table 14 shows values corresponding to Conditional Expressions (1) to (12) of the imaging lenses of Examples 1 to 5. In Examples 1 to 5, the d line is set as the reference wavelength. Table 14 shows the values on the d line basis.

TABLE 14

| Expression Number | Conditional Expression | Example 1 | Example 2 | Example 3 | Example 4 | Example 5 |
|---|---|---|---|---|---|---|
| (1) | f/f1 | −0.0318 | −0.0034 | 0.0581 | 0.0155 | 0.0128 |
| (2) | sH/f2 | 1.005 | 0.996 | 0.859 | 0.986 | 0.989 |
| (3) | h1/h2 | 0.5007 | 0.7699 | 0.3510 | 0.4222 | 0.5644 |
| (4) | f/(Bf × (h1/h2)) | 1.9598 | 1.5914 | 1.8777 | 1.8046 | 1.8976 |
| (5) | Ff2/d | −0.1994 | −0.2498 | −1.0781 | −0.7851 | −0.7025 |
| (6) | dG1/TTL | 0.2869 | 0.2725 | 0.3966 | 0.2926 | 0.2717 |
| (7) | TTL/d | 6.3785 | 8.0871 | 7.9383 | 4.8559 | 5.4292 |
| (8) | dG1/d | 1.8301 | 2.2041 | 3.1487 | 1.4210 | 1.4751 |
| (9) | Bf/d | 1.0658 | 1.9038 | 1.2274 | 0.8345 | 0.9336 |
| (10) | Bf/(f × tan(ωmax)) | 1.3524 | 2.2425 | 1.2509 | 1.7042 | 1.7991 |
| (11) | (f × tan(ωmax))/d | 0.7881 | 0.8490 | 0.9812 | 0.4897 | 0.5189 |
| (12) | TTL/(f × tan(ωmax)) | 8.0934 | 9.5256 | 8.0905 | 9.9164 | 10.4624 |

Figure 12:
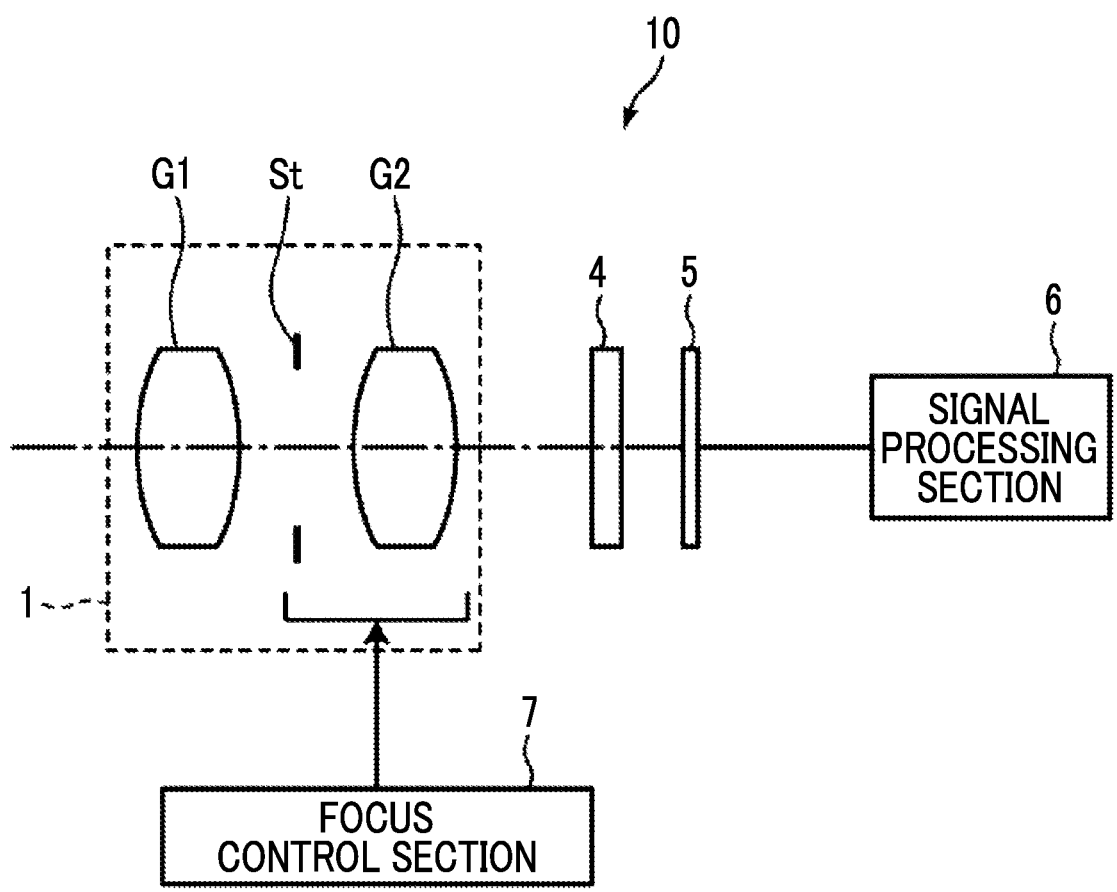
FIG. 12 is a schematic configuration diagram of an imaging apparatus according to an embodiment of the present invention.

Next, an imaging apparatus according to an embodiment of the present invention will be described. FIG. 12 is a schematic configuration diagram of an imaging apparatus 10 using the imaging lens 1 according to the above-mentioned embodiment of the present invention as an example of an imaging apparatus of an embodiment of the present invention. As the imaging apparatus 10, for example, there is an FA camera, a MV camera, or a surveillance camera.

The imaging apparatus 10 comprises: the imaging lens 1; a filter 4 that is disposed on the image side of the imaging lens 1; an imaging element 5; a signal processing section 6 that performs processing of calculating a signal which is output from the imaging element 5, and a focus control section 7 that is for performing focusing of the imaging lens 1. FIG. 12 schematically shows the first lens group G1, the aperture stop St, and the second lens group G2 which are belonging to the imaging lens 1. The imaging element 5 captures an image of a subject, which is formed through the imaging lens 1, and converts the image into an electrical signal. For example, CCD, CMOS, or the like may be used. The imaging element 5 is disposed such that the imaging surface thereof is coplanar with the image plane of the imaging lens 1. The imaging apparatus 10 comprises the imaging lens 1 according to the embodiment of the present invention. Therefore, a configuration can be made such that fluctuation in angle of view caused by focusing is small and the product outer diameter is small, and it is possible to acquire a favorable image regardless of the imaging distance.

The present invention has been hitherto described through embodiments and examples, but the present invention is not limited to the above-mentioned embodiments and examples, and may be modified into various forms. For example, values such as the radius of curvature, the surface distance, the refractive index, the Abbe number, and the aspheric surface coefficient of each lens are not limited to the values shown in the numerical examples, and different values may be used therefor.

For example, in each example, the lens system, which performs focusing from the infinite distance object to the close-range object, is used. However, it is needless to say that the present invention can be applied to an imaging lens which performs focusing from a long distance object at a finite distance to a close-range object.

The imaging apparatus according to the embodiment of the present invention is not limited to the above-mentioned examples, and may be modified into various forms such as a digital camera and an in-vehicle camera.

What is claimed is:

1. An imaging lens consisting of, in order from an object side to an image side:
    a first lens group;
    an aperture stop; and
    a second lens group that has a positive refractive power,
    wherein during focusing from a distant object to a close-range object, the first lens group remains stationary with respect to an image plane, and the aperture stop and the second lens group integrally move toward the object side,
    wherein in a state where an object at infinity is in focus, assuming that
        a focal length of a whole system is f,
        a focal length of the first lens group is f1,
        a distance from the aperture stop to an object side principal point of the second lens group in a direction of an optical axis is sH,
        a focal length of the second lens group is f2,
        a height of paraxial on-axis ray on a lens surface closest to the object side in the first lens group is h1,
        a height of paraxial on-axis ray on a lens surface closest to the image side in the first lens group is h2, and
        a back focal length of the whole system at an air-converted distance is Bf,
    all Conditional Expressions (1), (2), (3), and (4) are satisfied, $$-0.1 < f/f1 < 0.1 \tag{1}$$

$$0.8 < sH/f2 < 1.2 \tag{2}$$

$$0.3 < h1/h2 < 1 \tag{3}$$

$$1.4 < f/(Bf \times (h1/h2)) < 2.5 \tag{4}.$$

2. The imaging lens according to claim 1, wherein in a state where the object at infinity is in focus, assuming that
    a distance on the optical axis between the first lens group and the second lens group is d, and
    an air-converted distance on the optical axis from a lens surface closest to the object side in the second lens group to an object side focal point of the second lens group is Ff2 and where a direction toward the object side from the lens surface closest to the object side in the second lens group to the object side focal point of the second lens group is set as a negative direction,
Conditional Expression (5) is satisfied, $$-1.2 < Ff2/d < 0 \tag{5}.$$

3. The imaging lens according to claim 1, wherein in a state where the object at infinity is in focus, assuming that
    a distance on the optical axis from a lens surface closest to the object side to a lens surface closest to the image side in the first lens group is dG1, and
    a sum of the distance on the optical axis from the lens surface closest to the object side of the imaging lens to the lens surface closest to the image side of the imaging lens and the Bf is TTL,
Conditional Expression (6) is satisfied, $$0.2 < dG1/TTL < 0.5 \tag{6}.$$

4. The imaging lens according to claim 1, wherein an Abbe number of at least one lens of a lens closest to the object side or the second lens from the object side at the d line is greater than 40.

5. The imaging lens according to claim 1, wherein in a state where the object at infinity is in focus, assuming that
    a sum of the distance on the optical axis from the lens surface closest to the object side of the imaging lens to the lens surface closest to the image side of the imaging lens and the Bf is TTL, and
    a distance on the optical axis between the first lens group and the second lens group is d,
Conditional Expression (7) is satisfied, $$4 < TTL/d < 9 \tag{7}.$$

6. The imaging lens according to claim 1, wherein in a state where the object at infinity is in focus, assuming that
    a distance on the optical axis from a lens surface closest to the object side to a lens surface closest to the image side in the first lens group is dG1, and
    a distance on the optical axis between the first lens group and the second lens group is d,
Conditional Expression (8) is satisfied, $$1 < dG1/d < 4 \tag{8}.$$

7. The imaging lens according to claim 1, wherein in a state where the object at infinity is in focus, assuming that
    a distance on the optical axis between the first lens group and the second lens group is d,
Conditional Expression (9) is satisfied, $$0.5 < Bf/d < 3 \tag{9}.$$

8. The imaging lens according to claim 1, wherein the first lens group includes at least two negative lenses.

9. The imaging lens according to claim 1, wherein Conditional Expression (1-1) is satisfied, $$-0.06 < f/f1 < 0.06 \quad (1\text{-}1).$$

10. The imaging lens according to claim 1, wherein Conditional Expression (2-1) is satisfied, $$0.85 < sH/f2 < 1.1 \quad (2\text{-}1).$$

11. The imaging lens according to claim 1, wherein Conditional Expression (3-1) is satisfied, $$0.35 < h1/h2 < 0.8 \quad (3\text{-}1).$$

12. The imaging lens according to claim 1, wherein Conditional Expression (4-1) is satisfied, $$1.55 < f/(Bf \times (h1/h2)) < 2 \quad (4\text{-}1).$$

13. The imaging lens according to claim 2, wherein Conditional Expression (5-1) is satisfied, $$-1.1 < F f2/d < 0 \quad (5\text{-}1).$$

14. The imaging lens according to claim 3, wherein Conditional Expression (6-1) is satisfied, $$0.25 < dG1/TTL < 0.4 \quad (6\text{-}1).$$

15. The imaging lens according to claim 4, wherein the Abbe number of at least one lens of the lens closest to the object side or the second lens from the object side at the d line is greater than 40 and less than 85.

16. The imaging lens according to claim 5, wherein Conditional Expression (7-1) is satisfied, $$4.5 < TTL/d < 8.5 \quad (7\text{-}1).$$

17. The imaging lens according to claim 6, wherein Conditional Expression (8-1) is satisfied, $$1.4 < dG1/d < 3.5 \quad (8\text{-}1).$$

18. The imaging lens according to claim 7, wherein Conditional Expression (9-1) is satisfied, $$0.7 < Bf/d < 2 \quad (9\text{-}1).$$

19. An imaging apparatus comprising the imaging lens according to claim 1.

* * * * *